United States Patent
Yun et al.

(10) Patent No.: US 12,230,411 B2
(45) Date of Patent: Feb. 18, 2025

(54) METHOD FOR PRE-SEPARATION OF NUCLIDES IN SPENT FUEL

(71) Applicant: Xi'an Jiaotong University, Xi'an (CN)

(72) Inventors: Di Yun, Xi'an (CN); Yiwei Zhao, Xi'an (CN); Jie Qiu, Xi'an (CN); Yi Le, Xi'an (CN); Haibin Mu, Xi'an (CN); Yijia Luo, Xi'an (CN); Xinlu Gu, Xi'an (CN); Shuang Xiang, Xi'an (CN); Wenbo Liu, Xi'an (CN)

( * ) Notice: Subject to any disclaimer, the term of this patent is extended or adjusted under 35 U.S.C. 154(b) by 26 days.

(21) Appl. No.: 18/608,909

(22) Filed: Mar. 18, 2024

(65) Prior Publication Data

US 2024/0221966 A1    Jul. 4, 2024

(51) Int. Cl.
*G21F 9/00* (2006.01)

(52) U.S. Cl.
CPC .................................. *G21F 9/007* (2013.01)

(58) Field of Classification Search
CPC .................................. G21F 9/00; G21F 9/007
USPC ............................................................. 423/3
See application file for complete search history.

(56) References Cited

FOREIGN PATENT DOCUMENTS

WO   WO-2007147222 A2 * 12/2007 ........... C07C 229/12

OTHER PUBLICATIONS

CNIPA First Office Action for CN202310617004.3, Chinese language original, dated Nov. 5, 2023; pp. 1-3.
CNIPA First Office Action for CN202310617004.3, dated Nov. 5, 2023; English language machine translation generated Mar. 14, 2024 ; pp. 1-4.

* cited by examiner

*Primary Examiner* — Edward M Johnson
(74) *Attorney, Agent, or Firm* — Addison D. Ault; Richard P. Moerschell; IPGentleman Intellectual Property Services, LLC

(57) ABSTRACT

Nuclear reactors produce large amounts of spent fuel during operation. In addition to recyclable materials such as uranium and plutonium, spent fuel also contains significant amounts of fission products and highly radioactive transuranic (TRU) elements. Homogenization of nuclides in traditional post-processing technology hinders efficient fuel recycling. In order to improve the efficiency of spent fuel recycling, and to reduce the inevitable "highly radioactive waste" produced in existing spent fuel recycling processes, a novel method for pre-separating nuclides in spent fuel is disclosed. Specifically, we have developed a physical method, wherein an artificially created large temperature gradient drives the migration of fission gas bubbles in spent metallic nuclear reactor fuel. The fission gas bubbles preferentially carry fission products and transuranic elements to achieve effective pre-separation of these elements from spent fuel, lowering cost and improving efficiency of spent fuel recycling.

7 Claims, 3 Drawing Sheets

METHOD FOR PRE-SEPARATION OF NUCLIDES IN SPENT FUEL

CROSS-REFERENCE TO RELATED APPLICATION

This application claims priority to Chinese Patent Application No. 202310617004.3, filed on May 29, 2023 before the China National Intellectual Property Administration, the disclosure of which is incorporated herein by reference in entirety.

TECHNICAL FIELD

The present disclosure relates to the field of spent fuel post-processing, and in particular to a method for pre-separating nuclides in spent fuel based on a physical method.

BACKGROUND

Nuclear reactors produce large amounts of spent fuel during operation. In addition to uranium, plutonium and other useful materials that can be recycled, it also contains large amounts of fission products and highly radioactive materials such as transuranic (TRU) elements in the spent fuel. According to empirical speculation, the spent nuclear fuel of a standard PWR with a burnup of 33 GWd/t contains approximately 95.5% $UO_2$ matrix, 3.6% fission products and 0.9% transuranic elements. Therefore, spent fuel discharged from nuclear reactors must be reprocessed/post-processed. One of the core goals of spent fuel reprocessing technology is to separate different types of nuclides, recycle valuable nuclides, and concentratedly conduct deep geological storage for the highly radioactive waste.

Traditional post-processing technology mainly adopts a water process method, that is, a liquid extraction method is used to separate and extract nuclides. For this process, it first uses nitric acid solution to dissolve the spent fuel, and then carries out the liquid extraction separation and extraction steps. This dissolution process uniformly mixes all the elements in the spent fuel into the solution. While the dissolution process facilitates separation and extraction in the liquid extraction method, it also creates an obstacle to nuclide separation, namely homogenization. However, based on the principle of solvent extraction, there is often another problem when some nuclides (such as lanthanides, which account for about ⅓ of fission products) are separated from spent fuel, namely, it produces large amounts of toxic volatile organic solvents, and large amounts of secondary radioactive waste, etc., during the extraction process. Therefore, it is necessary to provide a method that can realize the pre-separation of some nuclides, which will make it possible to significantly reduce the cost of the subsequent water separation process, improve its efficiency, and reduce the inevitable "highly radioactive waste" produced in the water separation process.

SUMMARY

In order to solve the problem that homogenization in traditional post-processing technology causes obstacles to nuclide separation, the present disclosure provides a method for pre-separating nuclides in spent fuel based on a physical method.

In an operating nuclear reactor, the nuclear fuel works at a high temperature and it transfers heat to the cooling medium to achieve the ultimate goal of thermoelectric conversion. A large temperature gradient will occur during the operation of a typical oxide fuel, the pores in the oxide fuel (voids with a size of about microns produced during preparation) will migrate to the center under the driving force of the large temperature gradient, forming a central cavity. In the general analysis of fission gas behavior, the process of fission gas bubbles migrating to high temperature areas under the driving force of temperature gradient will also be reflected. In metallic nuclear fuel, this phenomenon is not significant. This is because the metallic fuel has high thermal conductivity and therefore has a limited temperature gradient during operation. However, after characterization of the metallic fuel burned in the reactor, it will be found that many fission products and transuranic elements in the metallic fuel will be enriched on the inner wall of the bubble. On the one hand, the accumulation of fission products and transuranic elements on the bubble wall will fix the bubble and make it more difficult to move; on the other hand, when the bubbles have a strong driving force for migration, they will carry the fission products and transuranic elements with them, to migrate together.

We speculate that if a large temperature gradient can be artificially introduced into the metallic fuel, the bubbles can be given a strong driving force to migrate, causing them to carry the solid fission products and transuranic elements to migrate to the inside (cracks and connected pores) and outside surfaces of the fuel, and further dissolving the solid fission products and transuranic elements through selective dissolution of ionic liquids, thereby achieving the effect of pre-separating part of the fission products and transuranic elements by physical methods.

Based on this, we propose to utilize a physical method, that is, an artificially created large temperature gradient, to drive the migration of fission gas bubbles in metallic fuel, thereby carrying fission products and transuranic elements, and ultimately achieving the pre-separation effect of fission products and transuranic elements. At present, there is no existing technology at home or abroad that is consistent with or similar in content to the present disclosure.

In order to achieve the above objects, the technical solutions of the present disclosure are as follows.

A method for pre-separating nuclides in spent fuel, comprising steps:

S1. generating a temperature of 1200 to 1600° C. in a center of a fuel element, and at the same time introducing a cooling medium to an outer surface of the fuel element, to introduce a temperature difference to heat the fuel element;

S2. soaking cooled spent fuel in an ionic liquid to selectively dissolve fission products and transuranic elements, so that the fission products and the transuranic elements are pre-separated from the spent fuel.

According to some embodiments of the present disclosure, in S1, the fuel element is a metallic spent fuel element, and the fuel element contains the spent fuel.

According to some embodiments of the present disclosure, in S1, the spent fuel is U—Zr metallic fuel, and the Zr element accounts for 10~50% mass percentage of the U—Zr metallic fuel.

According to some embodiments of the present disclosure, the spent fuel is U-10Zr metallic fuel or U-50Zr metallic fuel.

According to some embodiments of the present disclosure, in S1, a time for heating the fuel element is 6 to 10 hours.

According to some embodiments of the present disclosure, the time for heating the fuel element is 8 hours.

According to some embodiments of the present disclosure, in S1, the generating a temperature of 1200 to 1600° C. in a center of a fuel element comprises: inserting a metal probe into the center of the fuel element, so as to generate the temperature of 1200 to 1600° C. in the center of the fuel element.

According to some embodiments of the present disclosure, the metal probe is a molybdenum metal probe, and the metal probe has a size of 0.6 mm in diameter and 1 m in length.

According to some embodiments of the present disclosure, in S2, the ionic liquid is betaine-bis(trifluoromethylsulfonyl) imide ([Hbet][Tf$_2$N]).

According to some embodiments of the present disclosure, in S2, the fission products and the transuranic elements are any one or at least two of LA, Cm, or Am.

Beneficial Effects of the Present Disclosure

I. The method of the present disclosure mainly artificially introduces a large temperature gradient into the metallic fuel, gives the bubbles a strong driving force for migration, so that they can carry solid fission products and minor actinides to migrate into the inside (cracks and interconnected pores) and external surfaces of the fuel, and further dissolves the solid fission products and transuranic elements through selective dissolution of ionic liquids, thereby achieving the effect of pre-separating part of the fission products and transuranic elements by physical methods.

II. The present disclosure provides a post-processing method that relies on physical methods to pre-separate fission products and transuranic elements from spent fuel. This method can significantly reduce the volume and toxicity of high-level radioactive waste liquid produced during the chemical process of further post-processing of spent fuel, improve the efficiency of the post-processing process, and reduce the cost of spent fuel post-processing.

III. Adopting the method of the present disclosure helps to provide more technical support for spent fuel post-processing.

Figure 1:
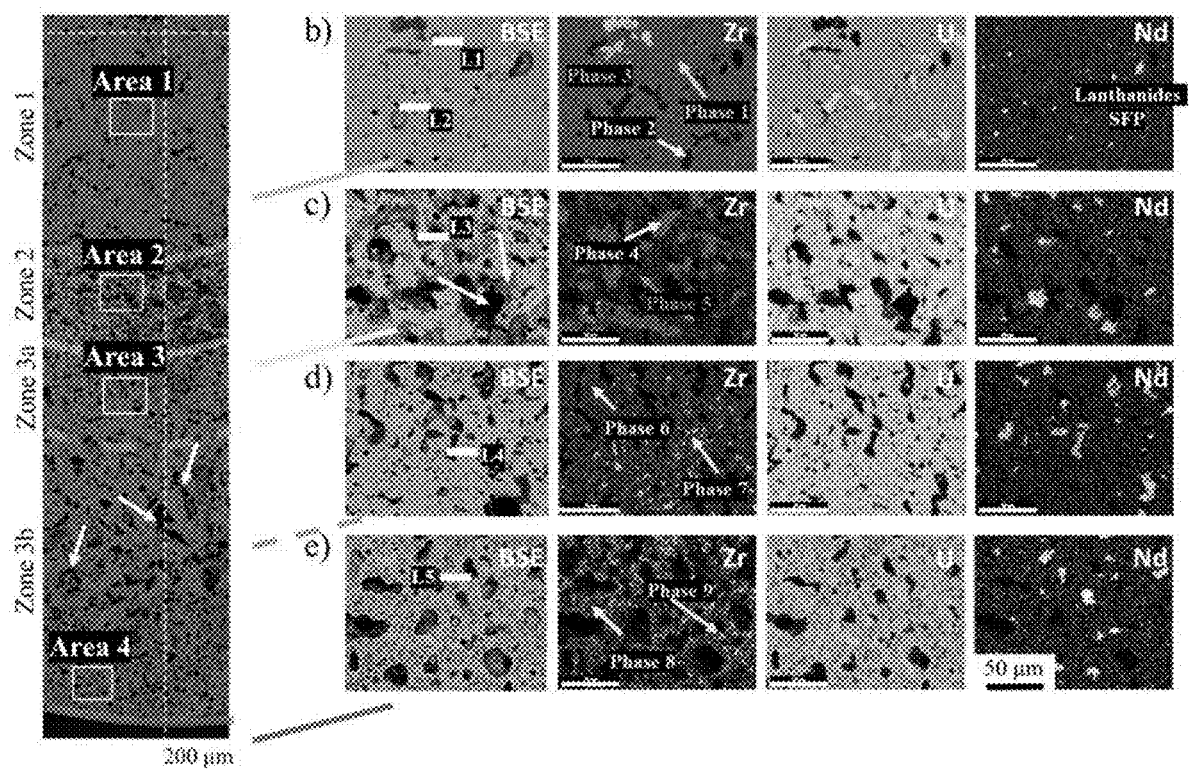
FIG. 1 is a diagram showing the distribution relationship between typical lanthanide fission products (Nd) and fission gas bubbles in U-10Zr metallic fuel under 13.2% FIMA burnup.

In the drawings: 1. Metal probe; 2. Fuel slug; 3. Fuel cladding; 4. Cooling medium.

DETAILED DESCRIPTION OF EMBODIMENTS

In order to make the purposes, technical solutions and advantages of the present disclosure clearer, the present disclosure will be further described in detail below in conjunction with embodiments. It should be understood that the specific embodiments described herein are only used to explain the present disclosure but not intended to limit the present disclosure.

Based on the embodiments of the present disclosure, all other embodiments may be obtained by those of ordinary skill in the art without creative efforts, and they all fall within the scope of the present disclosure.

Research has found that in spent fuel, Np and Pu dissolve each other and show similar migration behaviors. From the perspective of migration behavior, Np and Pu show similar behaviors, while Np basically does not migrate.

Like the lanthanide fission product LA, the solubility of Am in U, Pu or Zr is also very low. In terms of migration behavior, the migration behaviors of Am and LA are roughly similar. According to the correlation given by Johnson, Am is close to Pr and Nd in chemical and structural properties, indicating that these elements behave similarly during migration. The yield of Cm is smaller, and its equilibrium concentration is smaller than Am and Np, but the properties of Cm are more similar to Am and LA, so Cm has similar behavior to Am and LA. Based on this analysis, the following conclusions can be drawn: Cm, Am, and LA have similar migration behaviors; Np and Pu show similar behaviors, and since Np basically does not migrate, Np and Pu basically do not migrate. From this, we can use a physical method to pre-separate fission products and transuranic elements (Cm, Am, LA) from spent fuel.

Figure 3:
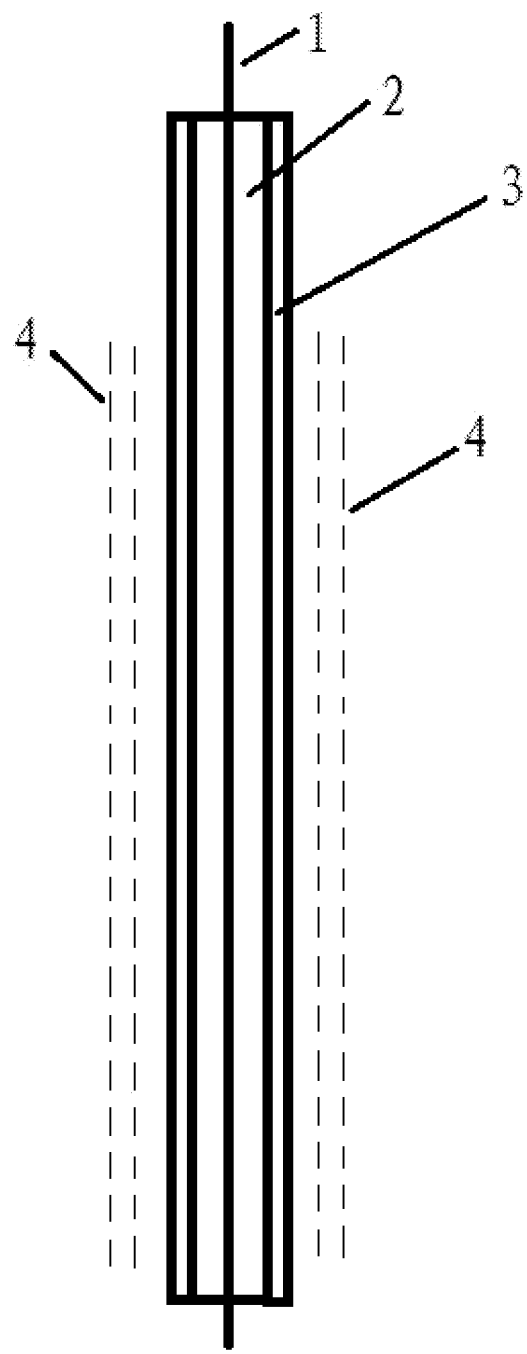
FIG. 3 is a working principle diagram of introducing high temperature into the interior of metallic fuel rods and applying external cooling.

FIG. 3 is a working principle diagram of introducing high temperature into the interior of metallic fuel rods and applying external cooling. In the drawings: 1. Metal probe; 2. Fuel slug; 3. Fuel cladding; 4. Cooling medium. The metal probe is a molybdenum metal probe, i.e., a metal molybdenum heating wire, with a size of 0.6 mm in diameter and 1 m in length. The cooling medium can be cooling water or cooling gas. By inserting the molybdenum metal probe into the fuel slug of the metallic fuel rod, high temperature (1200~1600° C.) is introduced into the fuel slug; at the same time, cooling water or cooling gas is introduced into the outer surface of the fuel element, thereby making the metallic fuel form a high-temperature difference between the inside and outside of the metallic fuel rod, and heating the metallic fuel rod through the artificially introduced high-temperature difference. In this way, elements such as Cm, Am, LA, etc. can migrate to the inside and outer surfaces of the fuel, and the solid fission products and transuranic elements can be further dissolved through selective dissolution of ionic liquids, thereby achieving the effect of pre-separation of part of fission products and transuranic elements by physical methods.

The method for selective dissolution of ionic liquid is: select [Hbet][Tf$_2$N] as the ionic liquid, place 2 mL of water-saturated [Hbet][Tf$_2$N] and 100 mg of sample in a 5 mL glass container to obtain a solution with a solid/liquid ratio of 50 mg/mL; then keep the solution at 25° C. for ultrasonic reaction for a period of time, and then centrifuge the solution at 7000 rpm for 5 minutes to separate the solution phase from the solid particles. The amount of specific solvent used can be increased accordingly in equal proportions.

Next, we use the method for pre-separating nuclides in spent fuel based on a physical method to verify the above theory. The specific method is as follows:

Embodiment 1

A method for pre-separating nuclides in spent fuel includes the following steps:

S1, as shown in FIG. 3, insert a molybdenum metal probe into the center of a U-10Zr metallic fuel rod to introduce a high temperature of 1200° C. to the center of the U-10Zr metallic fuel rod; at the same time, introduce cooling water to the outer surface of the fuel element to perform a dynamic water cooling on the outer surface of the U-10Zr metallic fuel rod; thus, form a high temperature difference between the inside and outside of the U-10Zr metallic fuel rod, and heat the U-10Zr metallic fuel rod for 8 hours through the artificially introduced high temperature difference.

S2, cool the spent fuel (U-10Zr metallic fuel) in the U-10Zr metallic fuel rod heated by the temperature difference to room temperature, and then immerse/soak the cooled spent fuel in a ionic liquid to selectively dissolve solid fission products and minor actinide elements (Cm, Am, LA) through the ionic liquid, so as to pre-separate fission products and transuranic elements from the spent fuel.

Embodiment 2

A method for pre-separating nuclides in spent fuel includes the following steps:

S1, insert a molybdenum metal probe into the center of a U-50Zr metallic fuel rod to introduce a high temperature of 1600° C. to the center of the U-50Zr metallic fuel rod; at the same time, introduce cooling water to the outer surface of the fuel element to perform a dynamic cooling water on the outer surface of the U-50Zr metallic fuel rod; thus, form a high temperature difference between the inside and outside of the U-50Zr metallic fuel rod, and heat the U-50Zr metallic fuel rod for 8 hours through the artificially introduced high temperature difference.

S2, cool the spent fuel (U-50Zr metallic fuel) in the U-50Zr metallic fuel rods heated by the temperature difference to room temperature, and then immerse/soak the cooled spent fuel in a ionic liquid to selectively dissolve solid fission products and minor actinide elements (Cm, Am, LA) through the ionic liquid, so as to pre-separate fission products and transuranic elements from the spent fuel.

Embodiment 3

A method for pre-separating nuclides in spent fuel includes the following steps:

S1, insert a molybdenum metal probe into the center of a U-20Zr metallic fuel rod to introduce a high temperature of 1400° C. to the center of the U-20Zr metallic fuel rod; at the same time, introduce cooling water to the outer surface of the fuel element to perform a dynamic cooling water on the outer surface of the U-20Zr metallic fuel rod; thus, form a high temperature difference between the inside and outside of the U-20Zr metallic fuel rod, and heat the U-20Zr metallic fuel rod for 8 hours through the artificially introduced high temperature difference.

S2, cool the spent fuel (U-20Zr metallic fuel) in the U-20Zr metallic fuel rods heated by the temperature difference to room temperature, and then immerse/soak the cooled spent fuel in a ionic liquid to selectively dissolve solid fission products and minor actinide elements (Cm, Am, LA) through the ionic liquid, so as to pre-separate fission products and transuranic elements from the spent fuel.

Embodiment 4

A method for pre-separating nuclides in spent fuel includes the following steps:

S1, insert a molybdenum metal probe into the center of a U-10Zr metallic fuel rod to introduce a high temperature of 1200° C. to the center of the U-10Zr metallic fuel rod; at the same time, introduce cooling water to the outer surface of the fuel element to perform a dynamic cooling water on the outer surface of the U-10Zr metallic fuel rod; thus, form a high temperature difference between the inside and outside of the U-10Zr metallic fuel rod, and heat the U-10Zr metallic fuel rod for 6 hours through the artificially introduced high temperature difference.

S2, cool the spent fuel (U-10Zr metallic fuel) in the U-10Zr metallic fuel rods heated by the temperature difference to room temperature, and then immerse/soak the cooled spent fuel in a ionic liquid to selectively dissolve solid fission products and minor actinide elements (Cm, Am, LA) through the ionic liquid, so as to pre-separate fission products and transuranic elements from the spent fuel.

Embodiment 5

A method for pre-separating nuclides in spent fuel includes the following steps:

S1, insert a molybdenum metal probe into the center of a U-10Zr metallic fuel rod to introduce a high temperature of 1200° C. to the center of the U-10Zr metallic fuel rod; at the same time, introduce cooling water to the outer surface of the fuel element to perform a dynamic cooling water on the outer surface of the U-10Zr metallic fuel rod; thus, form a high temperature difference between the inside and outside of the U-10Zr metallic fuel rod, and heat the U-10Zr metallic fuel rod for 10 hours through the artificially introduced high temperature difference.

S2, cool the spent fuel (U-10Zr metallic fuel) in the U-10Zr metallic fuel rods heated by the temperature difference to room temperature, and then immerse/soak the cooled spent fuel in a ionic liquid to selectively dissolve solid fission products and minor actinide elements (Cm, Am, LA) through the ionic liquid, so as to pre-separate fission products and transuranic elements from the spent fuel.

The methods in Embodiments 1 to 5 all use the insertion of ultra-fine refractory metal probes to introduce high temperature (for example, for U-10Zr metallic fuel, 1200° C.; for U-50Zr metallic fuel, 1600° C.) into the center of the metallic spent fuel rods, perform dynamic water cooling on the outer surface of the fuel rods, and heat the metallic fuel rod through the artificially introduced temperature difference. Afterwards, the spent fuel is cooled to room temperature, and the spent fuel is immersed in ionic liquid to selectively dissolve solid fission products and minor actinide elements to achieve pre-separation of these elements from the spent fuel. Therefore, the methods of Embodiments 1 to 5 can be used to achieve pre-separation of solid fission products and minor actinide elements (Cm, Am, LA) in spent fuel. Only the method of Embodiment 1 will be specifically analyzed and explained below.

FIG. 1 is a diagram showing the distribution relationship between typical lanthanide fission products (Nd) and fission gas bubbles in U-10Zr metallic fuel under 13.2% FIMA burnup.

As can be seen from FIG. 1, when burned to 13.2% FIMA burnup, the lanthanide fission products in the metallic fuel U-10Zr are completely attached to the inner wall surface of the fission gas bubbles. Therefore, by transporting the fission gas bubbles to the inside surface and outside surface of the fuel, the fission products and minor actinide elements such as Am, Cm, and LA can be effectively carried to the surface, thereby realizing the pre-separation of the fission products and minor actinide elements such as Am, Cm, and LA in the spent fuel.

Figure 2:
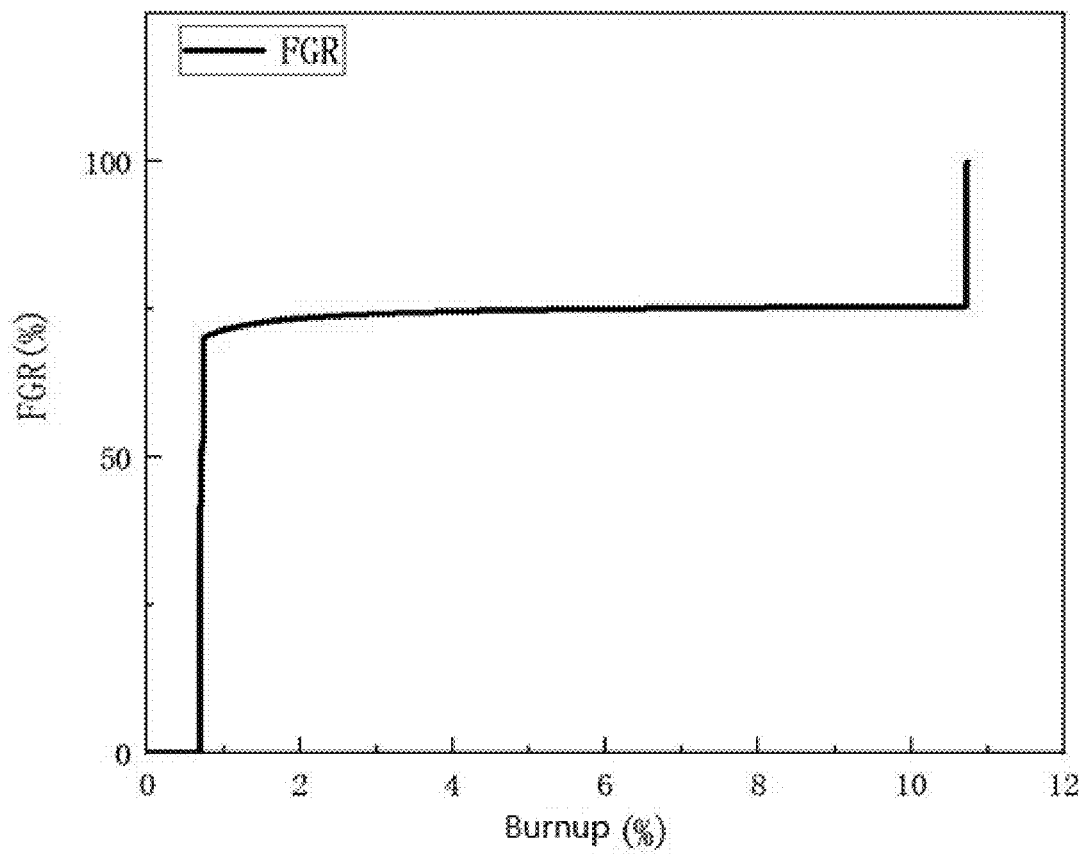
FIG. 2 is a short-term (8 hours) fission gas release curve produced by raising the temperature of the fuel slug (the center of the fuel) to 1200° C. in the spent fuel with a certain burnup (11% FIMA).

FIG. 2 is a short-term (8 hours) fission gas release curve produced by raising the temperature of the fuel slug (the center of the fuel) to 1200° C. in the spent fuel with a certain burnup (11% FIMA).

The simulation calculation results in FIG. 2 show that after the U-10Zr metallic fuel burned to 11% FIMA was artificially introduced with an extremely high center temperature (1200° C.), the release rate of the fission gas is rapidly increased to 100% within 8 hours. That is, all fission gas bubbles migrate to the surfaces inside and outside the fuel. This means that under such conditions, fission products and transuranic elements such as Am, Cm, and LA will also be enriched on the surfaces inside and outside the spent fuel. This drive of fission gas bubble migration through a very high temperature gradient, thereby carrying the fission products and minor actinide elements such as Am, Cm, and LA to the surfaces inside and outside the spent fuel, is the core innovative principle of the embodiments of the present disclosure. Then, these fission products and transuranic elements can be pre-separated from the spent fuel through the ionic liquid (betaine-bis(trifluoromethylsulfonyl) imide ([Hbet][Tf$_2$N])) selective dissolution method, it will be possible to significantly reduce the cost of the subsequent water separation process, improve its efficiency, and reduce the inevitable "highly radioactive waste" produced in the water separation process.

The above are only optional embodiments of the present disclosure but not intended to limit the present disclosure. Any modifications, equivalent substitutions and improvements made within the spirit and principle of the present disclosure shall fall within the protection scope of the present disclosure.

What is claimed is:

1. A method for pre-separating nuclides in spent fuel, comprising steps:
    S1: generating a temperature of 1200 to 1600° C. in a center of a fuel element, and at the same time introducing a cooling medium to an outer surface of the fuel element, to introduce a temperature difference to heat the fuel element; wherein the generating a temperature of 1200 to 1600° C. in a center of a fuel element comprises: inserting a metal probe into the center of the fuel element, so as to generate the temperature of 1200 to 1600° C. in the center of the fuel element; the fuel element is a metallic spent fuel element, and the fuel element contains the spent fuel
    S2: soaking cooled spent fuel in an ionic liquid to selectively dissolve fission products and transuranic elements, so that the fission products and the transuranic elements are pre-separated from the metallic spent fuel; wherein the ionic liquid is betaine-bis(trifluoromethylsulfonyl) imide.

2. The method for pre-separating nuclides in spent fuel according to claim 1, wherein in S1, the spent fuel is U—Zr metallic fuel, and the element Zr accounts for 10~50% mass percentage of the U—Zr metallic fuel.

3. The method for pre-separating nuclides in spent fuel according to claim 2, wherein the spent fuel is U-10Zr metallic fuel or U-50Zr metallic fuel.

4. The method for pre-separating nuclides in spent fuel according to claim 1, wherein in S1, a time for heating the fuel element is 6 to 10 hours.

5. The method for pre-separating nuclides in spent fuel according to claim 4, wherein the time for heating the fuel element is 8 hours.

6. The method for pre-separating nuclides in spent fuel according to claim 1, wherein the metal probe is a molybdenum metal probe, and the metal probe has a size of 0.6 mm in diameter and 1 m in length.

7. The method for pre-separating nuclides in spent fuel according to claim 1, wherein in S2, the fission products and the transuranic elements are any one or at least two of LA, Cm, or Am.

* * * * *